Dec. 4, 1962 W. A. HUNT 3,067,422

PHASE DISTORTION CORRECTION FOR HIGH DENSITY MAGNETIC RECORDING

Filed Dec. 24, 1958 3 Sheets-Sheet 1

INVENTOR

Warren A. Hunt

BY Sughrue & Rothwell

ATTORNEYS

INVENTOR
Warren A. Hunt
BY
Sughrue & Rothwell
ATTORNEYS

INVENTOR

Warren A. Hunt

BY Sughrue & Rothwell

ATTORNEYS

United States Patent Office 3,067,422

Patented Dec. 4, 1962

3,067,422
PHASE DISTORTION CORRECTION FOR HIGH DENSITY MAGNETIC RECORDING

Warren A. Hunt, Chappaqua, N.Y., assignor to International Business Machines Corporation, New York, N.Y., a corporation of New York Filed Dec. 24, 1958, Ser. No. 782,910
8 Claims. (Cl. 346—74)

This invention relates to a magnetic recording system for recording signals or bits on a magnetic surface and more particularly to such a system including means for correcting inherent phase shift that occurs at high signal densities for predetermined patterns of said signals.

A number of writing methods are presently employed for recording signals on a magnetic surface such as a tape, drum or disc. One of these methods is known as NRZI (non-return to zero IBM). In the NRZI method, a change in the direction of flux occurs in the center of the bit cell (either in the positive or negative direction) for each one bit and no change for each zero. As the bit density increases adjacent bits influence each other and phase shift occurs. This is due primarily to the flux pattern of adjacent bits overlapping to form a resultant flux pattern different than in the case with no interference between bits. This phase shift at high bit densities may obscure the stored data and the readback signal may not be a true indication of said data. For instance, a one bit may by virtue of the interference caused by its adjacent bits be shifted from one bit cell where it should correctly occur to the next bit cell. Readback signal then may read this one bit in a bit cell where actually a zero was stored. If the phase shift is less than one bit cell, the peak amplitude of the readback signal will not coincide with the center of the bit cell and a less than maximum response will be obtained at sampling time. To eliminate this phase shift, the present invention provides a novel writing scheme which anticipates that only certain coded patterns of bits cause phase shift, recognizes these certain patterns and modifies the normal writing operation accordingly. This modification will so store the bits of these certain patterns so as to compensate for the phase shift which they would otherwise manifest.

It is therefore an object of this invention to provide a magnetic recording system for recording information data which eliminates phase shift between adjacent bits of data at high densities.

It is a specific object of this invention to provide a magnetic recording system for recording signals at high signal densities which recognizes predetermined patterns of signals exhibiting inherent phase shift and provides a compensating phase shift for these predetermined patterns.

To accomplish this object and others that will be subsequently apparent, this invention provides a means for recording signals on a magnetic record which signals for certain predetermined patterns thereof exhibit inherent phase shift between the signals, means to recognize these predetermined patterns and to shift the phase of a signal to be recorded when said predetermined patterns are recognized.

For the purpose of identification, a bit being recorded is called the present bit, the bit just recorded previously is called the past bit, and the bit to be recorded after the present bit is called the future bit. For example, in the pattern 101, the zero is the present bit, the one to the right thereof the future bit and the one to the left thereof the past bit. The recording of the present bit is influenced at least by its immediately adjacent past and future bits. There are eight such possible patterns of bits as follows:

| | Past | Present | Future |
|---|---|---|---|
| A | 0 | 0 | 0 |
| B | 0 | 0 | 1 |
| C | 0 | 1 | 0 |
| D | 0 | 1 | 1 |
| E | 1 | 0 | 0 |
| F | 1 | 0 | 1 |
| G | 1 | 1 | 0 |
| H | 1 | 1 | 1 |

Since for NRZI recording there is no change of flux attempted on encountering a zero, patterns A, B, E, and F will not cause phase shift due to the fact that in each of these patterns the present bit is a zero. Of the other four cases where a one appears as the present bit, patterns C and H are symmetrical and also present no phase shift problem. However, in the case of patterns D and G it has been found that phase shift does occur.

For a detailed description of the means by which the phase shift is compensated, attention is now directed to the drawings.

Figure 7A:
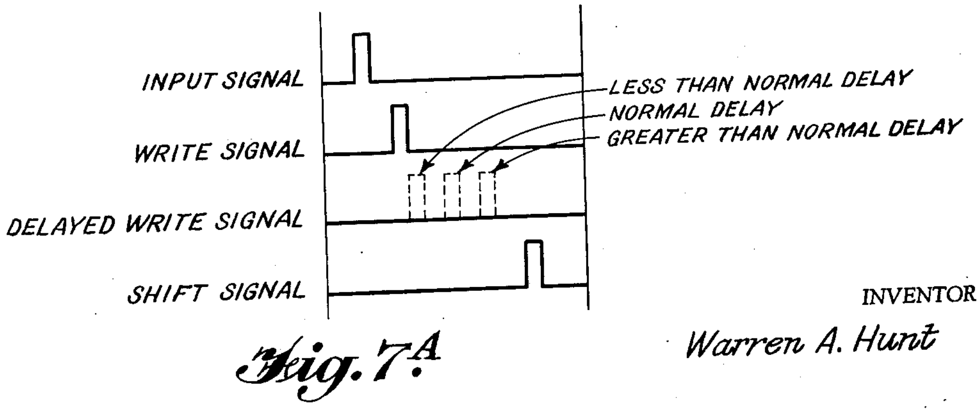
FIGURE 7 is a diagrammatic view showing the circuit employed in accordance with the present invention for providing either normal delay, more than normal delay, or less than normal delay for the present bit.
Figure 7:
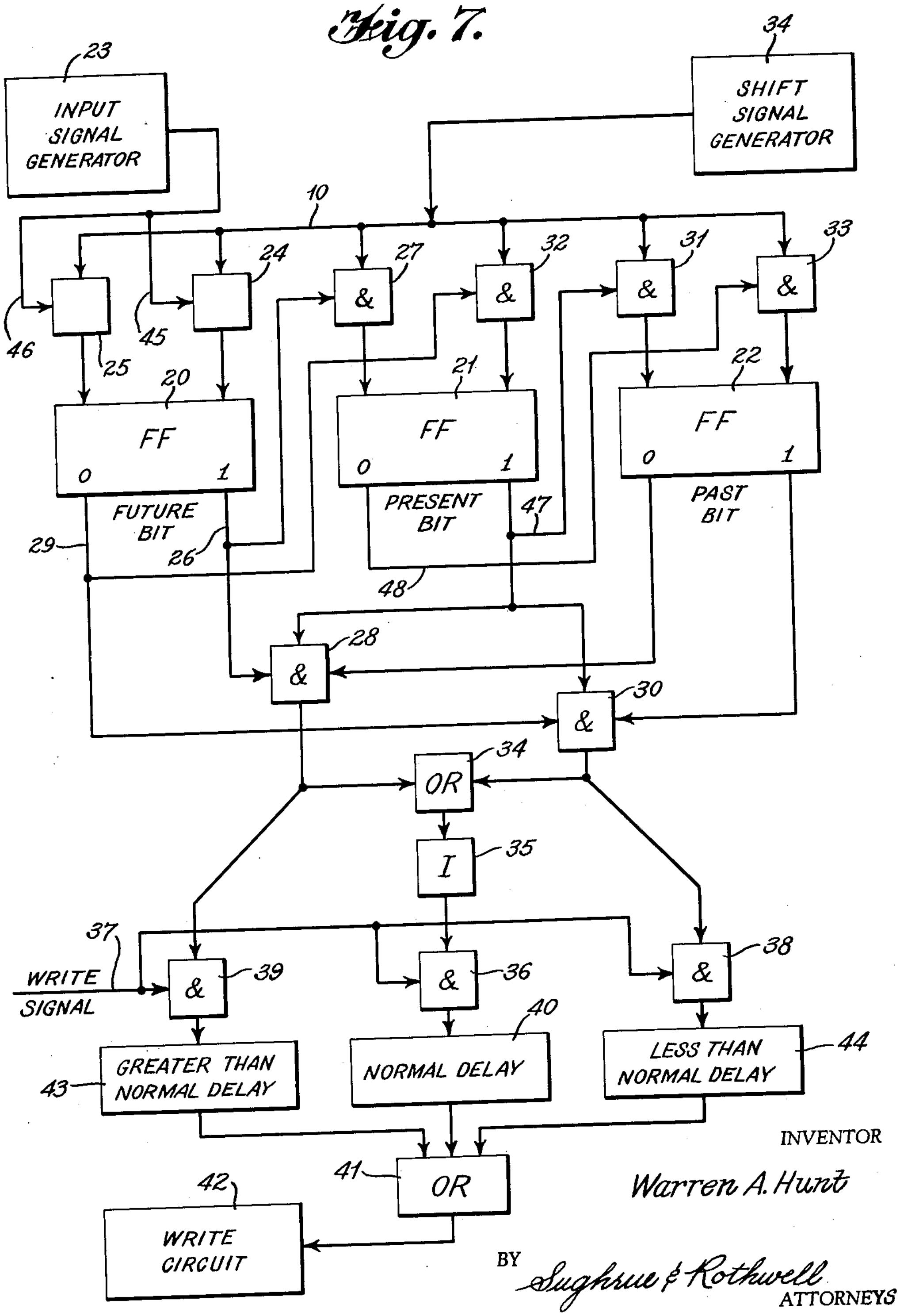

FIGURE 7*a* is a view showing the time relationship between the various signals appearing in the circuit of FIGURE 7.

Figure 1:
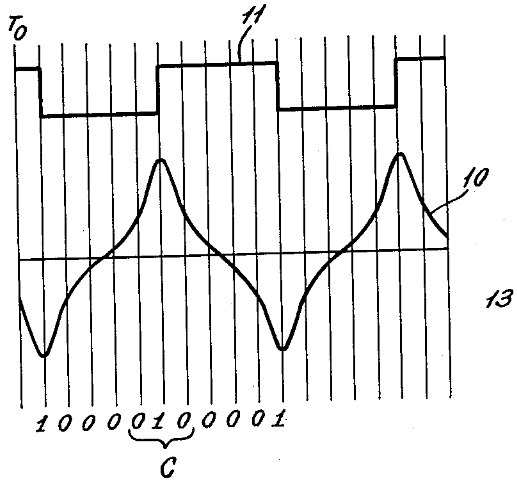
FIGURE 1 is a view showing the wave form of the write current employing the NRZI method for the binary number pattern 10000100001 and the readback signal therefor.

Turning to FIGURE 1, there is shown the readback signal 10 for the pattern 10000100001. The NRZI write current wave form for this pattern is shown at 11. It is seen here that the pattern C occurs and no phase shift is evident. The 1 occurs precisely in the center of the bit cell to which the write signal assigns it.

Figure 2:
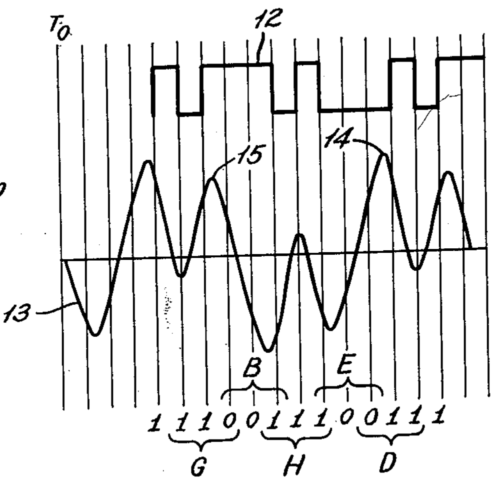
FIGURE 2 is a view showing the wave form of the write current employing the NRZI method for the binary number pattern 1110011100111 and the readback signal therefor.

In FIGURE 2 the current wave form 12 stores the pattern 1110011100111. The readback signal 13 manifests various patterns such as B, D, E, G, and H. It can be seen that the readback signal exhibits no phase shift for the H pattern (111), the B pattern (001), and the E pattern (100). However, the D pattern (011) does exhibit a phase shift at 14 to read back a present 1 before its proper time. The vertical lines in all of these figures represent the center of the bit cell and accordingly the correct time at which the readback signal should reach a maximum amplitude. Time $T_0$ appears at the left-hand side of these figures and time progresses towards the right. Consequently, in viewing any of these curves in any combination of numbers, the number to the right will be written and read back at a future time with relation to the number to its immediate left. The present bit, then, is always the middle of any three bits, the future bit is the one to the right thereof and the past bit is the one to the left thereof.

Figure 3:
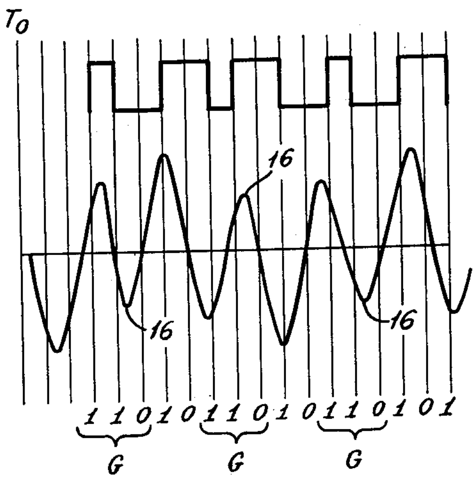
FIGURE 3 is a view showing the wave form of the write current employing the NRZI method for the binary number pattern 1101011010110101 and the readback signal therefor.

The G pattern (110) exhibits a phase shift at 15 to readback a present one after its proper time. FIGURE 3 illustrates again that the G pattern (110) reads back a present bit one after its proper time. The present bit one is shown at 16.

Figure 4:
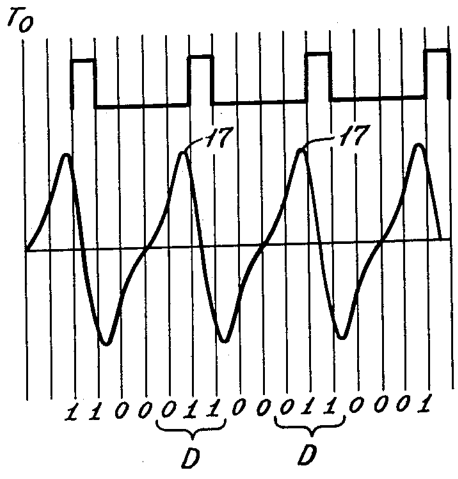
FIGURE 4 is a view showing the wave form of the write current employing the NRZI method for the binary number pattern 1100011000110001 and the readback signal therefor.

FIGURE 4 illustrates a readback signal of a present bit one before its proper time. This is shown at 17 for the pattern D.

Figure 5:
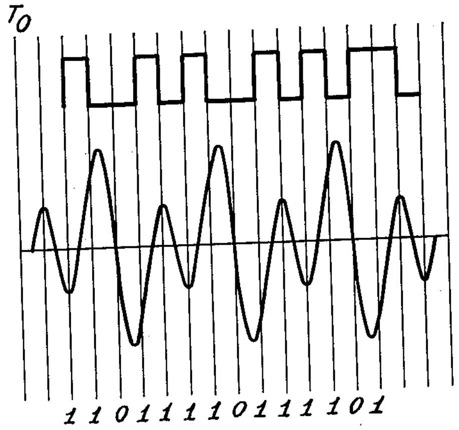
FIGURE 5 is a view showing the wave form of the write current employing the NRZI method for the binary number pattern 11011110111101 and the readback signal therefor.
Figure 6:
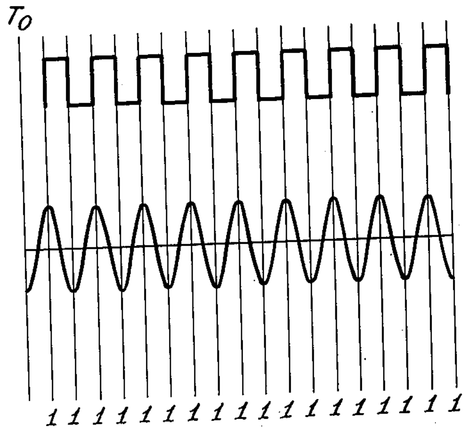
FIGURE 6 is a view showing the wave form of the write current employing the NRZI method for the binary number pattern 111111111111111111 and the readback signal therefor.

FIGURE 5 illustrates the pattern 11011110111101 and FIGURE 6 illustrates a pattern of one's.

In all of these figures it can be seen that only for patterns D and G is there any phase shift involved. At pattern G (110) the present bit one is read back too late and at pattern D (011) the present bit is read back too soon. All other patterns exhibit no phase shift.

The bits of FIGURES 1 to 6 were recorded at a density of 3000 bits per inch. As the bit density increases, not only the immediate past and future bits influence the present bit but other past and future bits in the sequence may be involved.

This invention proposes to sample the present bit and its immediate past and future bits to recognize those patterns which exhibit an inherent phase shift such as patterns D and G. When these patterns are recognized they are distinguished one from the other. If a D pattern is recognized (011) the present one bit is provided with more than normal delay before it is written on the recording surface. This compensates for its inherent tendency to move toward and past zero. If a G pattern is recognized (110) the present bit is provided with less than normal delay so as to compensate for its tendency to move towards the future zero. The circuit to accomplish this is shown in FIGURE 7.

Turning to FIGURE 7, employing positive going logic as illustrative, the AND gate 28 is unblocked to provide an uplevel output therefrom only when the shift register including bistable flip-flops 20, 21, and 22 registers a future one bit, present one bit, and past zero bit, in other words a D pattern. At all other times said gate is blocked and provides a downlevel output therefrom. Gate 30 provides an uplevel output therefrom only when the flip-flops register a future zero bit, present one bit and past one bit, in other words, a G pattern. At all other times it provides a downlevel output therefrom. OR gate 34 in the absence of an uplevel output from either gate 28 or gate 30 provides a downlevel output to the inverter 35. The inverter 35 then provides an uplevel output to AND gate 36. If the G pattern is registered, gate 30 conditions AND gate 38. If the D pattern is registered, gate 28 conditions AND gate 39. For all other patterns the inverter 35 conditions AND gate 36. For either the G or D patterns, inverter 35 provides a down level output therefrom and consequently blocks AND gate 36.

The write signal, a positive pulse, is applied to conductor 37 during each bit period, at a time slightly after the time at which each bit is fed to the register. The time relationship between the input signal from the input signal generator 23 and the write signal is shown in FIGURE 7*a*.

Let it now be assumed that the register stores the pattern 000. Under these circumstances the right side of each of the flip-flops 20, 21, and 22 are down and the left sides thereof are up. Since gates 28 and 30 are blocked, gate 36 is conditioned to feed the write signal from conductor 37 to the normal delay unit 40. This delay unit functions in a conventional manner as a pulse delay circuit to provide a gated output to the OR gate 41 and thence to the write circuit 42 which gate determines the writing time for the present bit zero. If the pattern were 010 or any other symmetrical pattern or present zero bit pattern, gate 36 would again be conditioned to pass the write signal to the write circuit 42 to write a present bit with normal delay. If the pattern were future bit zero, present bit one, and past bit one (G pattern) gate 30 would be unblocked by the register to thereby unblock gate 38. OR gate 34 would provide an uplevel to inverter 35 and the output of inverter 35 would block gate 36. The register would block gate 28 and consequently gate 39. The write signal pulse finds only gate 38 conditioned and provides a gated output from the less-than-normal delay unit 44. The output from this unit 44 through OR gate 41 would function to write the present bit one in this pattern with a less-than-normal delay. By the same logic, the D pattern provides a gated output from the more-than-normal delay unit 43 to write the present one thereof with greater-than-normal delay.

Referring for a moment to FIGURES 1 to 6, inclusive, in order to avoid confusion, it should be noted that the time axis is at the left and time increases from left to right. In any combination of digits the right-hand digit is the future digit to be written at a future time, the middle digit is the present digit and the left-hand digit is the past digit which has been written at a past time.

The effect on the register of the sequence of bits in the pattern 1110011100111 is shown in the following chart No. 2. This pattern is illustrated in FIGURE 2.

| Time ↓ | Bit to Register | Future Bit | Present Bit | Past Bit | Pattern | Write | Delay |
|---|---|---|---|---|---|---|---|
| | 1 | 1 | 0 | 0 | B | 0 | N |
| Shift | | 0 | 1 | 0 | | | |
| | 1 | 1 | 1 | 0 | D | 1 | M |
| Shift | | 0 | 1 | 1 | | | |
| | 1 | 1 | 1 | 1 | H | 1 | N |
| Shift | | 0 | 1 | 1 | | | |
| | 0 | 0 | 1 | 1 | G | 1 | L |
| Shift | | 0 | 0 | 1 | | | |
| | 0 | 0 | 0 | 1 | E | 0 | N |
| Shift | | 0 | 0 | 0 | | | |
| | 1 | 1 | 0 | 0 | B | 0 | N |
| Shift | | 0 | 1 | 0 | | | |
| | 1 | 1 | 1 | 0 | D | 1 | M |
| Shift | | 0 | 1 | 1 | | | |
| | 1 | 1 | 1 | 1 | H | 1 | N |
| Shift | | 0 | 1 | 1 | | | |
| | 0 | 0 | 1 | 1 | G | 1 | L |
| Shift | | 0 | 0 | 1 | | | |
| | 0 | 0 | 0 | 1 | E | 0 | N |
| Shift | | 0 | 0 | 0 | | | |
| | 1 | 1 | 0 | 0 | B | 0 | N |
| Shift | | 0 | 1 | 0 | | | |
| | 1 | 1 | 1 | 0 | D | 1 | M |
| Shift | | 0 | 1 | 1 | | | |
| | 1 | 1 | 1 | 1 | H | 1 | N |
| Shift | | 0 | 1 | 1 | | | |
| | 0 | 0 | 1 | 1 | G | 1 | L |

NOTE.—Time—N=Normal. M=More. L=Less.

Chart 2 shows the delays applied to the writing of each bit in sequence necessary to compensate for the D and G patterns. The circuit of FIGURE 7 will apply the proper delays to each present bit to compensate for the inherent phase shift of D and G patterns. The D pattern is always given more-than-normal delay (M) to write its present bit later in time and the G pattern is always given less-than-normal delay (L) to write its present bit sooner in time. All other patterns are given normal delay (N).

With the register storing a 000 pattern and each of the stages composed of a bi-stable flip-flop in their zero state, the zero outputs are all down and the one outputs are all up. Gates 28 and 30 provide downlevels to block gates 38 and 39. Inverter 35 provides an uplevel to gate 36. The first write signal passes through gate 36 to the normal delay unit 40. The output of unit 40 provides a normal delay gate through OR gate 41 to the write circuit 42. Write circuit 42 writes a zero with normal delay.

At the next bit period input signal generator 23 applies a positive pulse indicative of a one to conductors 45 and 46. Since this pulse is applied through OR gates 24 and 25 to both sides of the future bit flip-flop stage 20 of the register, this stage switches to its one state. By so doing it applies a down level to conductor 26 and an up level to conductor 29. This conditions AND gate 32. AND gate 27 is blocked. Since the present bit stage flip-flop 21 is in its zero state, it applies an uplevel to conductor 47 and a downlevel to conductor 48. AND gate 33 is blocked and AND gate 31 is conditioned. The register then stores a future bit one, a past bit zero and a present bit zero. The write signal writes a zero with normal delay.

The shift pulse from the shift signal generator 34 is applied through OR gates 24 and 25 to shift flip-flop 20 to its zero state. It is applied through AND gate 32 to shift flip-flop 21 to its one state and through AND gate 31 to provide no change of state for the past bit stage flip-flop 22. The register now registers a present bit one and future and past bit zeros.

A one pulse in the next bit period from input signal generator 23 stores a one in the future bit flip-flop 20. The register now stores a present bit one, a future bit one, and a past bit zero. The write signal on conductor 37 causes the write circuit 42 to write a present bit one with greater than normal delay. The shift pulse then shifts the register to store a present bit one, a past bit one, and a future bit zero. The next one to flip-flop 20 stores a 111 in the register. The write signal causes the write circuit 42 to write a present bit one with normal delay. This process is continued with the results indicated in chart No. 2.

FIGURE 7*a* illustrates the time relationship between an input pulse, a write signal, the three possible delayed signals depending upon the pattern in the register and the shift signal.

The type of recording to which this invention relates is not limited to the NRZI system. The 011 and 110 patterns manifested by the NRZI system exemplify the phase shift occurring in a first pattern characterized by no change in flux direction, change of flux direction and change of flux direction with successive bit cells and a second pattern characterized by change, change and no change in flux direction.

What has been shown is one embodiment of the present invention. Other embodiments obvious to those skilled in the art are contemplated to be within the spirit and scope of the following claims.

What is claimed is:

1. A magnetic recording system comprising a source of signals exhibiting an inherent phase shift between signals for predetermined patterns thereof, means to recognize said patterns and means to shift the phase of a signal to be recorded when said patterns are recognized.

2. A magnetic recording system for recording signals on a magnetic recording surface, said signals exhibiting an inherent phase shift between signals ocurring in a predetermined pattern comprising means to recognize said pattern and means to shift the phase of the signal to be recorded when said pattern is recognized.

3. A magnetic recording system for recording signals occurring in a plurality of patterns on a magnetic recording surface, said signals exhibiting an inherent phase shift between signals occuring in predetermined ones of said plurality, comprising means to sample all of said patterns and to recognize said predetermined patterns and means to shift the phase of a signal to be recorded to compensate for said inherent phase shift when said predetermined patterns are recognized.

4. A magnetic recording system for recording signals ocurring in a plurality of patterns on a magnetic recording surface, said signals exhibiting an inherent phase shift in one direction for one of said patterns and an inherent phase shift in the opposite direction for another of said patterns comprising means to recognize said one and said another patterns and means for shifting the phase of a signal to be recorded in said opposite direction when said one of said patterns is recognized and for shifting the phase of a signal to be recorded in said one direction when said another of said patterns is recognized whereby said inherent phase shift is compensated.

5. A magnetic recording system for recording digital signals occurring in sequential bit periods as a plurality of 1's and 0's on a magnetic recording surface, said signals exhibiting an inherent phase shift in one direction for a 110 pattern of signals and an inherent phase shift in the opposite direction for a 011 pattern of signals comprising a shift register, means to store said signals in said shift register, means to sample the composition of said register each bit period, means to recognize a 110 pattern and a 011 pattern of signals in said register and to distinguish between said two patterns and means to shift the phase of a signal to be recorded when said two patterns are recognized to compensate for said inherent phase shift.

6. A magnetic recording system for recording digital signals occurring in sequential bit periods as a plurality of 1's and 0's on a magnetic recording surface, said signals exhibiting an inherent phase shift in one direction for a 110 sequence of signals and an inherent phase shift in the opposite direction for a 011 sequence of signals comprising a shift register, a first phase shift network for shifting the phase of a signal in said one direction, a second phase shift network for shifting the phase of a signal in said opposite direction, means for sampling the composition of said register each bit period and means to enable said first phase shift network when said composition represents a 011 pattern of signals and to enable said second phase shift network when said composition represents a 110 pattern of signals.

7. A magnetic recording system for recording digital signals occurring in sequential bit periods as a plurality of 1's and 0's on a magnetic recording surface, said signals exhibiting an inherent phase shift for predetermined patterns of said ones and zeros, comprising a shift resigter including a future bit stage, a present bit stage and a past bit stage, means to store said signals in said shift register, first, second and third phase shift networks, first second and third gating means associated respectively with said phase shift networks, means to sample the composition of said register to determine the bit content thereof, means to condition a selected gating means as a function of said register content, a source of write signals, means to feed said write signals to said gating means, whereby said write signal in cooperation with said selected gating means, enables said phase shift network associated with said selected gating means to write said present bit stored in said present bit stage with a phase shift as determined by said associated phase shift network to thereby compensate for said inherent phase shift.

8. A magnetic recording system for recording digital signals occurring in sequential bit periods as a change in flux direction for one type of signal and no change in flux direction for another type of signal on a magnetic recording surface, said signals exhibiting an inherent phase shift between signals occurring in the pattern (1) no change in flux direction, change in flux direction, and change in flux direction, in successive bit periods and in the pattern (2) change in flux direction, change in flux direction and no change in flux direction in successive bit periods comprising means to recognize said (1) and (2) patterns and means to shift the phase of the signal to be recorded when said pattern (1) and pattern (2) are recognized.

References Cited in the file of this patent

UNITED STATES PATENTS

| | | |
|---|---|---|
| 2,148,478 | Kock | Feb. 28, 1939 |
| 2,734,186 | Williams | Feb. 7, 1956 |
| 2,764,463 | Lubkin | Sept. 25, 1956 |
| 2,770,797 | Hamilton et al. | Nov. 13, 1956 |
| 2,782,626 | Jochum et al. | Feb. 26, 1957 |
| 2,804,605 | DeTurk | Aug. 27, 1957 |
| 2,813,259 | Burkhart | Nov. 12, 1957 |
| 2,890,440 | Burkhart | June 9, 1959 |

FOREIGN PATENTS

| | | |
|---|---|---|
| 167,864 | Australia | June 8, 1956 |

OTHER REFERENCES

Proceedings of Eastern Joint Computer Conf., Dec. 8–10, 1954, pub. by A.I.E.E. (copy in Div. 42), pages 16 to 21.

Radio and TV News, April 1954, pages 42, 53, 90, 92 and 93.